Nov. 15, 1960   B. A. SCHEPMAN   2,960,233
FILTER AND FILTER MEDIUM THEREFOR
Filed May 1, 1957   4 Sheets-Sheet 2

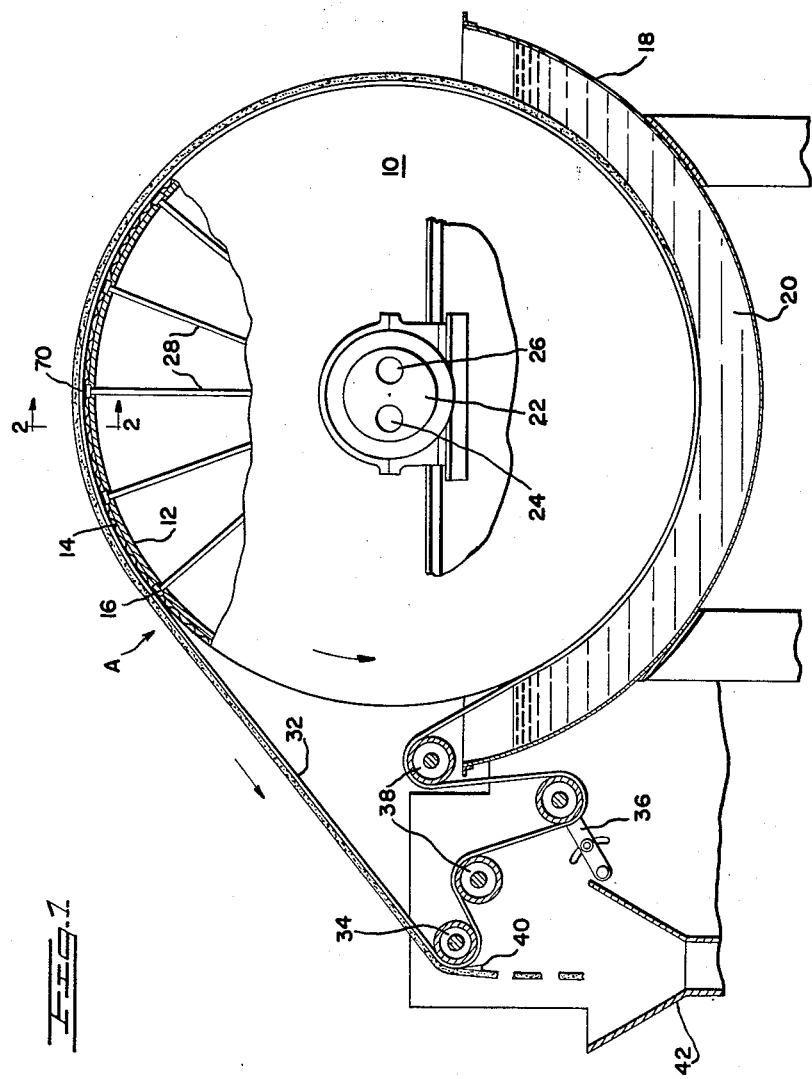

INVENTOR
BERNE A. SCHEPMAN
BY Harold T. Stowell
Harold L. Stowell
ATTORNEYS

Nov. 15, 1960 B. A. SCHEPMAN 2,960,233
FILTER AND FILTER MEDIUM THEREFOR
Filed May 1, 1957 4 Sheets-Sheet 3
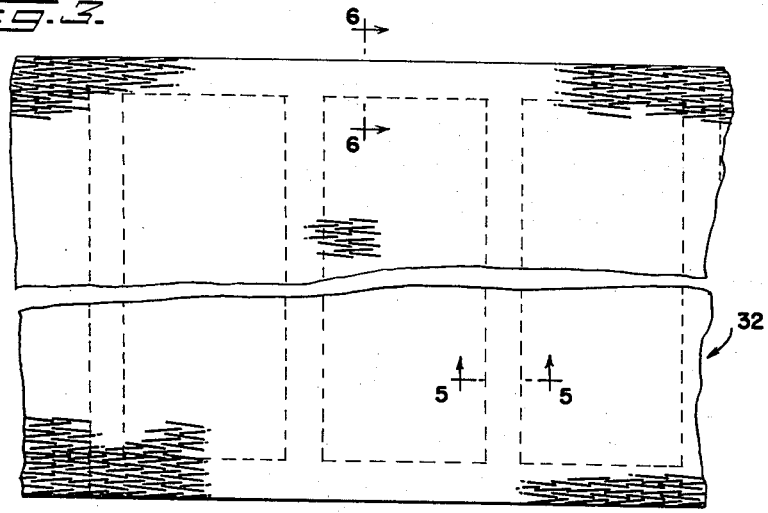
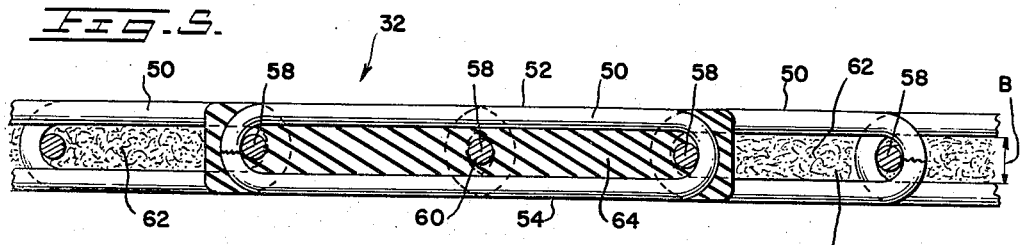
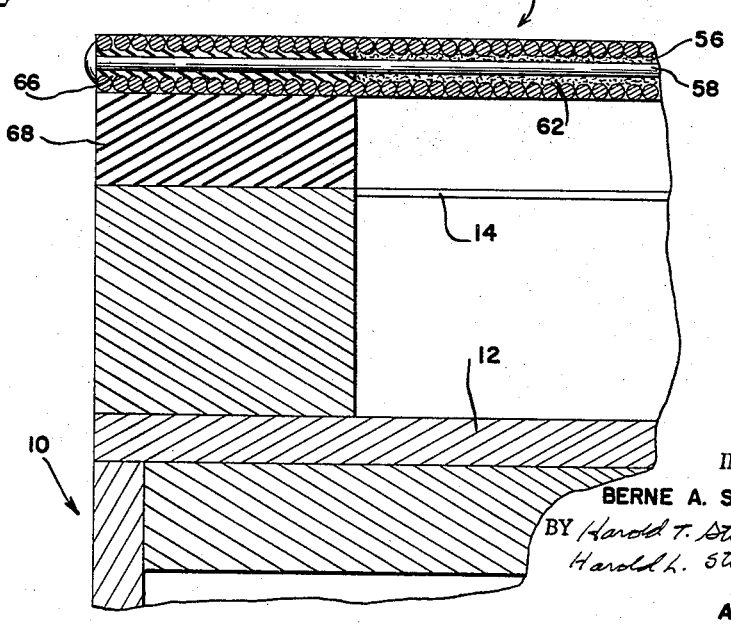
INVENTOR.
BERNE A. SCHEPMAN
BY Harold T. Stovall
Harold L. Stovall
ATTORNEYS Nov. 15, 1960  B. A. SCHEPMAN  2,960,233
FILTER AND FILTER MEDIUM THEREFOR
Filed May 1, 1957  4 Sheets-Sheet 4
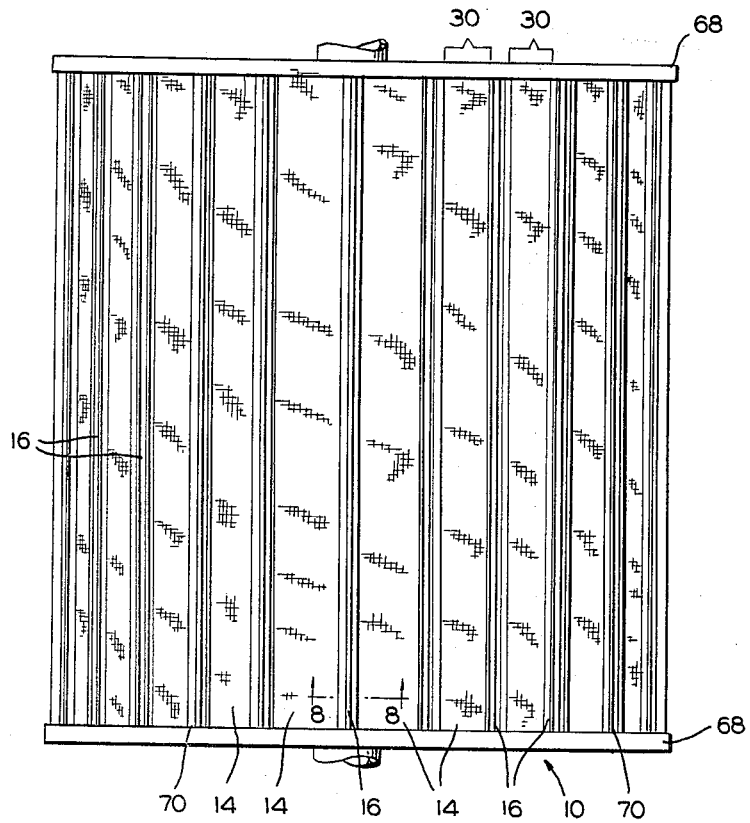
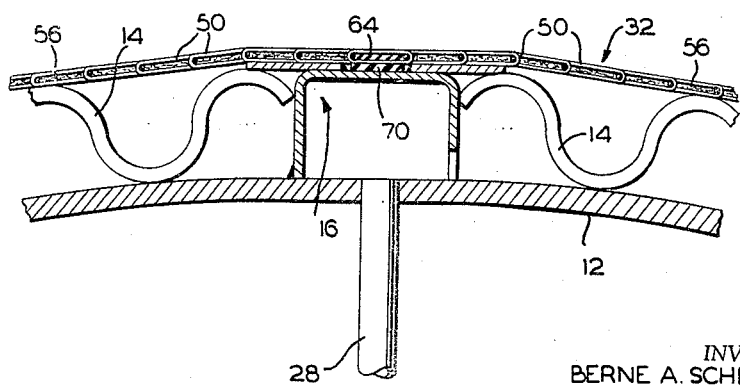
INVENTOR.
BERNE A. SCHEPMAN
ATTORNEYS United States Patent Office 2,960,233
Patented Nov. 15, 1960

2,960,233

FILTER AND FILTER MEDIUM THEREFOR

Berne A. Schepman, San Mateo, Calif., assignor, by mesne assignments, to The Cimco Corporation, Salt Lake City, Utah, a corporation of Delaware Filed May 1, 1957, Ser. No. 656,278

1 Claim. (Cl. 210—396)

This invention relates to filters and filter media therefor. In particular, the invention relates to filters of the type having filter cake forming, and filter cake discharge portions in their operating cycle and while the invention will be particularly described with reference to a rotary drum type vacuum filter wherein the filter medium is entrained about a drum partially submerged in a slurry to be filtered and then about plural discharge and wash rollers, many of the novel aspects of the invention are applicable to other forms of industrial filters such as the non-traveling web rotary drum, rotary disc and rotary pan filters.

In general, filters of the types referred to include a grid or perforated support member upon which is supported a permeable filter cloth of felted or woven fabric or metal. A slurry to be filtered is introduced adjacent the outer surface of the filter cloth and means are provided for forcing the liquid suspending the slurry through the filter medium and its supporting grids. The slurry, in passing through the filter medium forms a cake of suspended material on the outer surface thereof and the liquid is withdrawn substantially free of particulate material. The filter cake formed on the outer surface of the filter medium is periodically removed by rapping, scraping, or directing pressure fluid against the inner surface of the medium to blow the cake therefrom in order to maintain filtration efficiency.

While substantially all commercial filters of the classes described employ felted or woven fabrics as their filter media, many difficulties are encountered in continuous filtration operations which generally can be summarized as follows:

(1) Low filtration and/or washing rates due to blinding of the filter media;

(2) Poor cake discharge resulting from sticky cake, filter media blinding or too thin a cake for the particular type of filter;

(3) High filter media cost caused by short life and frequent down-times for cloth changing;

(4) Loss of valuable recoverable solids.

The need for new filtration equipment and filter media therefor capable of eliminating the previously referred to difficulties has been greatly accelerated by recent developments in chemical extractive metallurgy and advances in physical ore dressing techniques, where valuable elements are to be recovered and the slurries contain large amounts of colloidal slimes which are very difficult to filter.

It is, therefore, a principal object of the present invention to provide a new and improved filter device and filter medium that permits the maintenance of high vacuum level on the filter, reduces filter medium wear to a minimum, decrease down-time for changing the filter medium, substantially improves cake discharge even with thin filter cakes, and substantially reduces the loss of valuable elements from slurries to be filtered.

These and other objects and advantages are provided in a filter device having a filter cake forming and filter cake discharge portions in its filtration cycle comprising a permeable filter medium support, a filter medium carried on said support, means for directing a slurry to be filtered to the filter medium, means for urging the slurry to pass serially through the filter medium and the support member and means for removing the filter cake formed on the filter medium wherein said filter medium comprises, a pair of spaced, parallel substantially planar surface members, each of said members composed of plural intermeshed filaments, and means maintaining said members in their spaced parallel relationship.

The invention will be more particularly described with reference to the accompanying drawings wherein:

Fig. 1 is a vertical view in partial section of a travelling web-type rotary drum filter embodying the principles of the present invention;

Fig. 3 is a plane view of a portion of the filter media employed on the filtration device shown in Fig. 1;

Fig. 5 is a section substantially on line 5—5 of Fig. 3;

Fig. 6 is a section substantially on line 6—6 of Fig. 3;

Fig. 7 is a top plan view of the drum of the drum filter shown in Fig. 1 with the endless filter medium removed to show the axially extending division strips and the drainage grids; and Fig. 8 is an enlarged sectional view on line 8—8 of Fig. 7 with the filter medium in aligned position.

Figure 2:
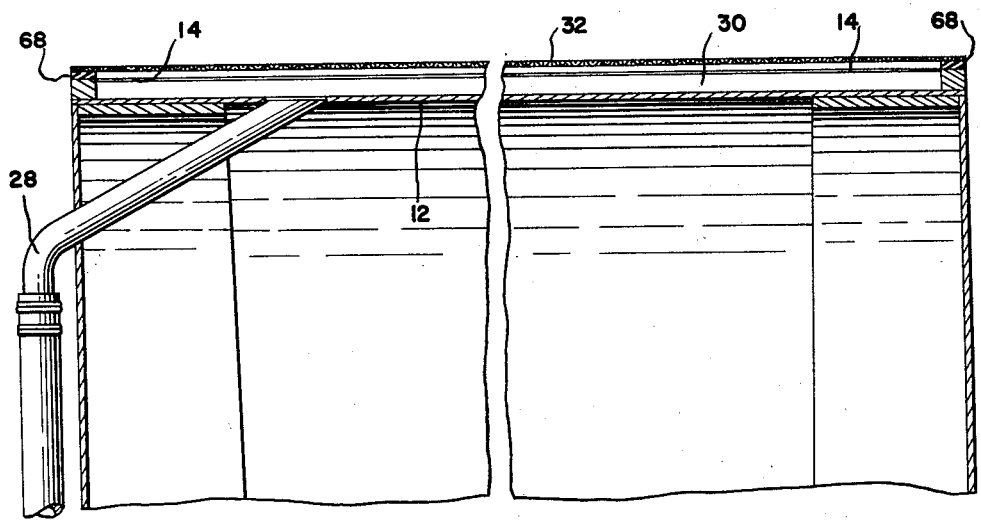
Fig. 2 is a section substantially on line 2—2 of Fig. 1.

Referring to the drawings and, in particular, to Figs. 1 and 2 thereof, 10 is a rotary drum having a filter deck 12 upon which is supported a plurality of grid members 14 which divide the deck into a plurality of segments extending between axially extending division strips 16. The drum is mounted adjacent its ends for rotation in a trough 18 adapted to receive a slurry to be filtered 20.

At one end of the drum a conventional filter valve generally designated 22 is provided, which valve is connected to a source of vacuum through conduit 24 and where desired a source of pressure through conduit 26. A plurality of conduits 28 connect the suction conduit 24 and/or the pressure conduit 28 with the drainage spaces designated 30 between the filter medium support members 14 and the upper surface of the drum deck 12 in each segment of the filter.

Extending about a portion of the cylindrical drum 10, in contact with the permeable support members 14, is an endless web or belt 32, constructed as to be described in detail hereinafter with reference to Figs. 3, 4, 5 and 6.

The filter assembly also includes a discharge roller designated 34 about which the filter web 32 passes. The assembly may also include tensioning rollers such as indicated at 36 and belt aligning rollers as indicated at 38.

It is also contemplated that where desired a doctor knife or scraper may be provided as generally indicated at 40 to improve the discharge quality of the filter where the filter cake is of a tenacious nature.

In operation of the improved filter of the present invention, a slurry to be filtered is fed into the tank or trough 18 and the drum 10 is rotated in the direction of the directional arrows whereby the filter medium 32 and the drum deck 12 pass into the slurry to be filtered. Vacuum is applied to the filter segments within the trough 18 and a filter cake is formed upon the outer surface of the filter medium 32 which filter cake is further de-watered as it passes out of the trough 18 as the drum continues to rotate.

At point A the filter medium 32 carrying the substantially de-watered filter cake on its external surface leaves the drum to pass around the discharge roller 34 where the filter cake separates from the filter medium, with or without the aid of the scraper blade 40, and falls into a hopper 42 for further treatment or disposal as the case may be. The filter medium after removal of the filter cake then passes about the aligning rollers 38 and the tensioning roller 36 and back onto the drum deck where a further filter cake is formed upon its surface.

In order for the filtration cycle, as hereinabove described, to function properly, it is necessary that the filter medium 32 be in sealing engagement with the edges of the rotary drum 10 during the filter cake forming and filter cake drying portions of the cycle and that a positive seal be maintained between the filter medium 32 and the various segments of the drum deck formed by division members 16. In addition to these expedients, it is necessary that the filter medium be one that is readily cleaned of filter cake adjacent the discharge roller 34, have good transverse stability which improves tracking and prevents side folding and bunching and one that will present a substantially plane surface for the use of the scraper knife 40 and still properly remove the suspended material from the slurry to be filtered.

All of these functions are very satisfactorily carried out by the new and improved filter medium of the present invention which will be described in greater detail with reference to Figs. 3 through 6.

In the preferred embodiment of the present invention, the filter medium 32 comprises an endless belt composed of a plurality of intermeshed spirals formed of a metal not subject to corrosion by the slurry to be filtered. The spirals generally designated 50 are elongated to provide substantially flat upper and lower faces 52 and 54 between which is maintained spaces 56 as more clearly shown in Fig. 5 of the drawings. Each of the plural spirals 50 are intermeshed and interconnected by rods 58 which pass through the intersurface spaces 56 of adjacent spirals 50. The extended ends of the rods 58 may be provided with enlarged heads or the rods 58 may be track-welded to the outer volutes of one of the intermeshed elements, whereby the completed web is composed of a plurality of intermeshed, articulatively joined elements.

It will be particularly noted that the plural spiral elements 50 are assembled from alternating left and right-hand spirals thereby equalizing belt traction and substantially improving lateral stability and reducing lateral creepage to a minimum as the belt passes about the rotary drum 10 and the plural discharge, aligning and tensioning rollers. It will further be noticed that in the form of the invention shown in the application drawings, each spiral 50 has included within its intersurface space 56 three pins 58. The end pins 58 connect adjacent spirals 50 having the same slope while the center pin specifically designated 60 in Fig. 5 of the drawings connects spirals of the alternate hand. This form of construction reduces to a minimum the size of the open spaces in the two surfaces 52 and 54 of the assembly.

It will be appreciated, however, that the length of the spirals 50 and/or the number of pins included within the interspiral spacing 56 may be variously modified and satisfactory results may be obtained when only two pins are provided within each spiral unit 50 eliminating the center spiral element. It is further pointed out that while the employment of alternating left- and right-hand spirals is advantageous many of the novel features of the present filter medium may be realized when the intermeshed elements are composed of a plurality of oval or flattened links which are strung in side-by-side relationship upon retaining pins 58.

Figure 4:
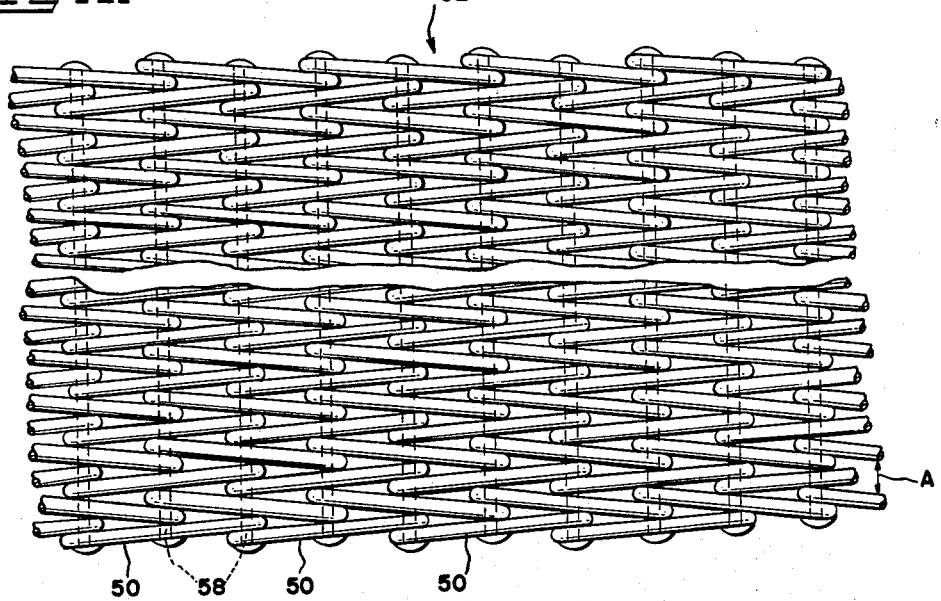
Fig. 4 is an enlarged fragmentary view of the filter media shown in Fig. 3.

The novelty of the improved filter medium will be apparent from the following discussion of its functions. When the filter medium as shown in Fig. 4 of the drawings is initially passed through the slurry to be filtered in tank 18, the suspended particles within the slurry fill the intersurface spaces of each of the spiral members as shown in Fig. 5 of the application drawings. The slurry formed within the intersurface spaces is designated with the reference numeral 62. This mat, of filtered particles, which deposits within the spaces 56 functions similar to pre-coating of a conventional cloth or wire filter medium and greatly improves the clarity of the filtrate. The advantage of the intersurface coating over conventional precoating systems is that the intersurface mat is not removed by the scraper knife 40 as the filtration cycle progresses but always remains intact within the spiral links 50 throughout the entire filtration period. It will be appreciated that a conventional precoat material may be employed to form the intersurface mat which precoat mat would not be removed by the doctor blade as in conventional filters.

A further novel feature of the present invention is the means for sealing the filter medium about its lateral edges and transversely thereof as shown more clearly in Figs. 3, 5 and 6. The lateral and transverse seals generally designated 64 and 66 respectively are provided by impregnating a portion of the intersurface spaces 56 with a liquid plastic or rubber composition which upon drying or polymerizing forms an impervious layer between the protective surfaces 52 and 54 of the filter medium. In conjunction with the lateral and transverse seals 64 and 66, the drum structure is provided with resilient gasket means 68 about the lateral edges thereof and at 70 as shown in Fig. 1 adjacent the division strips 16 which divide the drum deck into the plural filter segments. The combination of the impervious resilient intersurface seals 64 and 66 with the resilient members 68 and 70 secured to the drum very satisfactorily prevent loss of suction through the lateral edges of the assembled unit and leakage between adjacent segments of the rotary drum filter as the intersurface seals 66 along the lateral edges of the filter medium and the intersurface seals 64 cooperate with drum deck seals 68 and the division strip seals 70 as illustrated in Figs. 6 and 8 of the drawings.

The resilient members 68 and 70 provided on the drum may be constructed of any of the conventional, natural or synthetic rubbers, or resilient plastic materials. Similar materials obtainable in the liquid or unpolymerized form may be employed as a sealing substance for the filter medium per se. Satisfactory results may be obtained by the use of the butyl rubbers, chloroprene polymers and copolymers, styrene elastomers, butadiene-acryonitrile copolymers and the like.

As hereinbefore discussed, the material from which the plural links of the novel filter medium may be constructed may be metal or single filaments of nylon, "Mylar" and the like synthetic resins. It has also been found that satisfactory filter media may be constructed in accordance with the teachings of the present invention when the plural spiral filaments are from about 12 to about 24 gauge and when the maximum spacing between adjacent filaments of the assembly is not greater than the intersurface spacing of each of the spiral elements. Further, it has been found that in general good results are obtained when the maximum spacing between adjacent filaments is not greater than 3 times the gauge number of the filament employed in the construction.

It will be appreciated, however, that the selection of a particular gauge number for the filaments, the intersurface spacing of the spirals and the spacing between adjacent filaments would be determined to a great extent by the particular nature of the slurry to be filtered. Where the slurry comprises large flocks of a tenacious nature, larger spacing between individual filaments and a greater intersurface spacing would be desirable. However, where the slurry to be filtered comprises fine suspended material, the distance between adjacent filaments would be kept to a minimum with a corresponding reduction in the intersurface spacing.

Example

In the filtration of sewage sludge from sewage disposal plants, very satisfactory operation is provided with a filter medium constructed of number 22-gauge stainless steel spiral filaments having a two millimeter spacing between each volute of each spiral element designated A in Fig. 4 of the drawings and a two millimeter intersurface spacing designated B in Fig. 5 of the drawings.

While the present invention has been described with particular reference to rotary drum filters, it will be readily seen that the novel filter media disclosed herein may be employed on other forms of filters such as the rotary pan filter, the rotary disc filter, and filter presses while maintaining many of the fundamental advantages of the present invention.

From the foregoing description, it will be seen that the present invention fully accomplishes the aims, objects and advantages hereinbefore disclosed whereby substantially improved filtering apparatus and filter media therefor is provided.

I claim:

A filter including a filter medium, said filter medium comprising a plurality of closely intermeshed filaments formed to provide a pair of substantially permeable planar surface members interconnected in spaced relationship to provide a plurality of completely open intersurface spaces, a filter medium support member, one of said permeable planar surface members of the filter medium contacting said support member, means presenting a slurry of filtrable material to the other of the permeable planar surface members, means for urging the slurry to be filtered against said other of said permeable planar surface members of the filter medium to impregnate the said completely open intersurface spaces between said permeable planar surface members with filtrable material from the slurry and thereafter forming on said other of said permeable planar surface members a filter cake from the filtrable material from the slurry, and means for removing the formed filter cake from said other of said permeable planar surface members of the filter medium while maintaining the filtrable material in the said completely open intersurface spaces between said permeable planar surface members.

References Cited in the file of this patent

UNITED STATES PATENTS

| | | |
|---|---|---|
| 660,027 | Proctor | Oct. 16, 1900 |
| 1,850,044 | Young | Mar. 15, 1932 |
| 2,065,384 | Lomax | Dec. 22, 1936 |
| 2,314,294 | Wallny | Mar. 16, 1943 |
| 2,418,934 | Hirsch | Apr. 15, 1947 |
| 2,615,575 | Wright | Oct. 28, 1952 |
| 2,690,265 | Bixby | Sept. 28, 1954 |

FOREIGN PATENTS

| | | |
|---|---|---|
| 64,359 | Germany | Dec. 3, 1891 |
| 848,797 | Germany | Sept. 8, 1952 |

UNITED STATES PATENT OFFICE
CERTIFICATION OF CORRECTION

Patent No. 2,960,233 November 15, 1960

Berne A. Schepman

It is hereby certified that error appears in the above numbered patent requiring correction and that the said Letters Patent should read as corrected below.

In the grant, lines 2 and 12, and in the heading to the printed specification, line 4, name of assignee, for "The Cimco Corporation", each occurrence, read --- The Eimco Corporation ---.

Signed and sealed this 9th day of May 1961.

(SEAL)
Attest:
ERNEST W. SWIDER
Attesting Officer

DAVID L. LADD
Commissioner of Patents